United States Patent
Roy et al.

(10) Patent No.: US 10,425,152 B2
(45) Date of Patent: Sep. 24, 2019

(54) SATELLITE COMMUNICATION SYSTEM, GROUND STATION AND SATELLITE COMMUNICATION METHOD

(71) Applicant: Hughes Network Systems LLC, Germantown, MD (US)

(72) Inventors: Satyajit Roy, Germantown, MD (US); George Choquette, Germantown, MD (US)

(73) Assignee: HUGHES NETWORK SYSTEMS LLC, Germantown, MD (US)

( * ) Notice: Subject to any disclaimer, the term of this patent is extended or adjusted under 35 U.S.C. 154(b) by 110 days.

(21) Appl. No.: 15/827,696

(22) Filed: Nov. 30, 2017

(65) Prior Publication Data

US 2019/0165856 A1    May 30, 2019

(51) Int. Cl.
*H04B 7/185*    (2006.01)
*H04B 7/155*    (2006.01)

(52) U.S. Cl.
CPC ..... *H04B 7/18541* (2013.01); *H04B 7/15592* (2013.01); *H04B 7/18513* (2013.01); *H04B 7/18517* (2013.01)

(58) Field of Classification Search
CPC ............ H04B 7/18513; H04B 7/18515; H04B 7/18517; H04B 7/18506; H04B 7/18508; H04B 7/2041; H04B 7/18571; H04B 7/15592; H04B 7/155; H04B 7/1851; H04B 7/18539; H04B 7/18541; H04W 84/06

See application file for complete search history.

(56) References Cited

U.S. PATENT DOCUMENTS

| | | | | |
|---|---|---|---|---|
| 2004/0066347 A1* | 4/2004 | Schiff | ............... | H04B 7/18513 343/776 |
| 2008/0159419 A1* | 7/2008 | Smith | ............... | H04B 7/18534 375/260 |
| 2018/0337723 A1* | 11/2018 | Arnaud | ............... | H04B 7/18517 |

* cited by examiner

*Primary Examiner* — Peter Chen
(74) *Attorney, Agent, or Firm* — Global IP Counselors, LLP

(57) ABSTRACT

A satellite communication system includes a communication terminal and a ground station. The ground station is configured to communicate with the communication terminal through a satellite communication path between the ground station and the communication terminal via a satellite. The ground station includes a diversity switch and an electronic controller. The diversity switch is configured to switch the satellite communication path from a first satellite communication path to a second satellite communication path different from the first satellite communication path. The electronic controller is configured to transmit an offset value of network parameters of the first and second satellite communication paths to the communication terminal through the second satellite communication path. The communication terminal is configured to update a propagation parameter for communication with the ground station based on the offset value in response to receiving the offset value through the second satellite communication path.

19 Claims, 8 Drawing Sheets

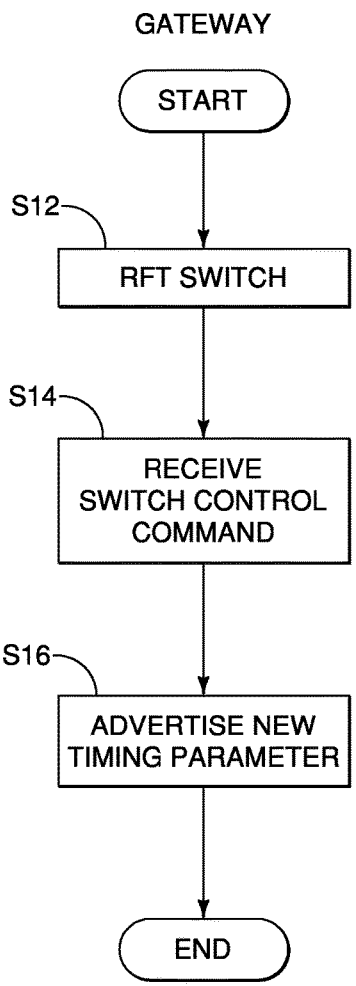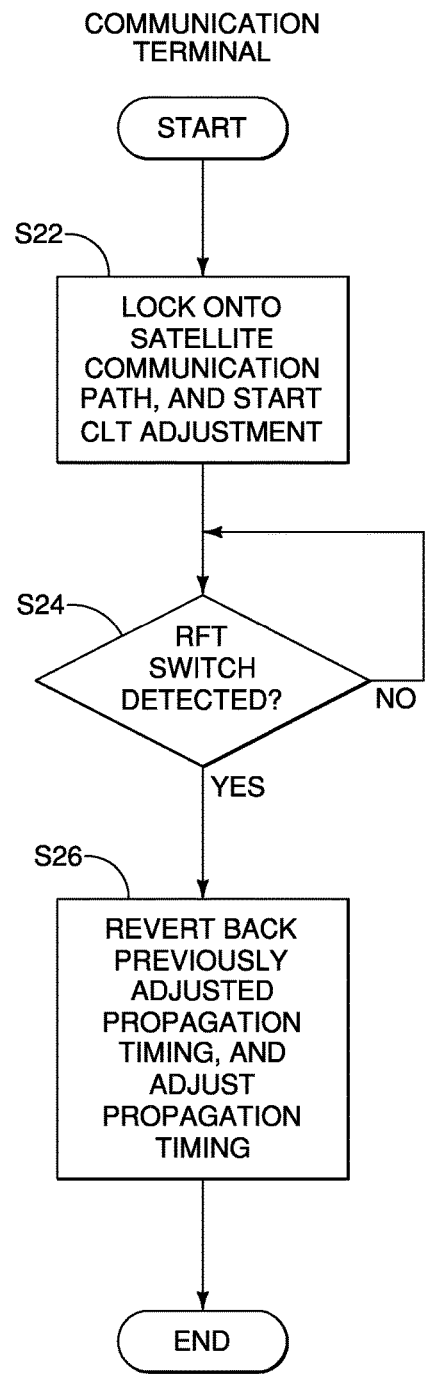
FIG. 5A
FIG. 5B

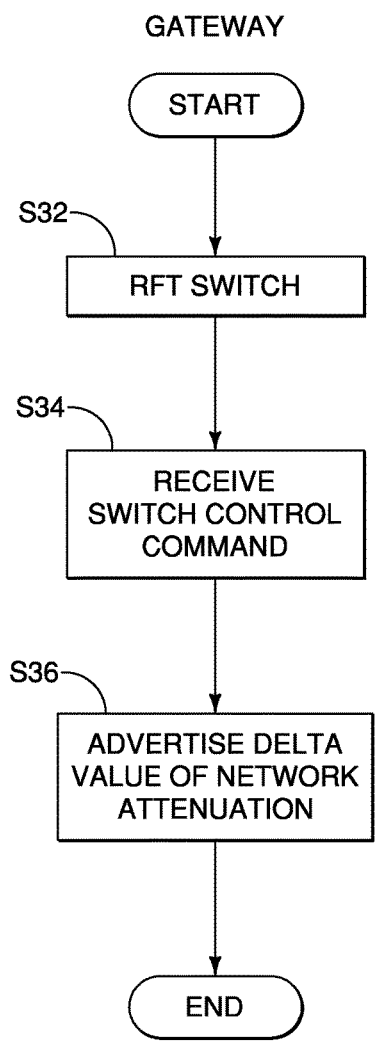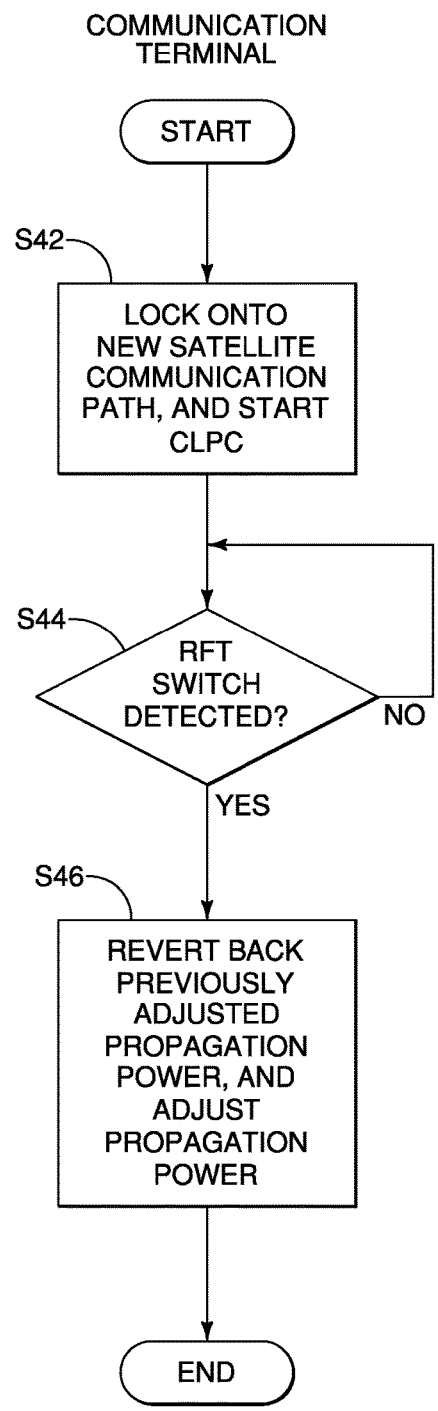
FIG. 7A
FIG. 7B

SATELLITE COMMUNICATION SYSTEM, GROUND STATION AND SATELLITE COMMUNICATION METHOD

BACKGROUND

Field of the Invention

The present invention generally relates to a satellite communication system. More specifically, the present invention relates to a satellite communication system in which a ground station is configured to communicate with a communication terminal through a satellite communication path. Also, the present invention generally relates to a ground station and a satellite communication method.

Background Information

Satellite communication systems have emerged as an option for users to establish communication to terrestrial data networks, such as the Internet. Satellite communication systems typically utilize a very small aperture terminal (VSAT) at the user location. The VSAT allows users to access the terrestrial data networks. The VSAT is associated with a gateway or ground station which provides a point of connection to the terrestrial data networks for the satellite communication system.

Satellite communication systems are susceptible to the effects environmental conditions such as rain, snow, etc., ("rain fade") which can result in service disruptions. With satellite communication systems, a radio frequency (RF) site diversity is utilized to remedy the service disruptions caused by localized rain fade. Normally, two RF sites are deployed 50-100 kilometers apart from each other with one collocated with the gateway, and are selectively utilized to avoid the service disruptions. For example, an RF site diversity from one RF site to another RF site is executed when rain fade at the one RF site is forecasted based a weather forecast. These RF sites also provide equipment redundancy to the satellite communication systems.

SUMMARY

The above-mentioned RF site diversity also involves switching of a satellite communication path between the gateway and the VSATs via a satellite. This introduces step changes in network characteristics of the satellite communication path, such as network delay, network attenuation and the like. Once the step changes in the network characteristics occur, adjustment of a propagation parameter is required, such as propagation timing, propagation power and the like, at the VSATs for establishing communication with the gateway along a new satellite communication path. However, this adjustment can lead to a longer duration traffic disruption along the new satellite communication path. Similarly, adjustment of the propagation parameter is also required when multiple communication paths that are deployed to provide path redundancy between a gateway to a given RFT site are selectively utilized.

One object is to provide a satellite communication system with which traffic disruptions due to switching of a satellite communication path is avoided or minimized.

In view of the state of the known technology, a satellite communication system is provided that includes a communication terminal and a ground station. The ground station is configured to communicate with the communication terminal through a satellite communication path between the ground station and the communication terminal via a satellite. The ground station includes a diversity switch and an electronic controller. The diversity switch is configured to switch the satellite communication path from a first satellite communication path to a second satellite communication path different from the first satellite communication path. The electronic controller is configured to transmit an offset value of network parameters of the first and second satellite communication paths to the communication terminal through the second satellite communication path. The communication terminal is configured to update a propagation parameter for communication with the ground station based on the offset value in response to receiving the offset value through the second satellite communication path.

Also, other features, aspects and advantages of the disclosed satellite communication system will become apparent to those skilled in the field of the satellite communication system from the following detailed description, which, taken in conjunction with the annexed drawings, discloses several illustrative embodiments of a satellite communication system with various features.

BRIEF DESCRIPTION OF THE DRAWINGS

Referring now to the attached drawings which form a part of this original disclosure:

FIG. 5A is a flowchart showing the propagation parameter update process for updating the propagation timing at the satellite gateway;

FIG. 5B is a flowchart showing the propagation parameter update process for updating the propagation timing at the VSAT;

FIG. 7A is a flowchart showing the propagation parameter update process for updating the propagation power at the satellite gateway;

FIG. 7B is a flowchart showing the propagation parameter update process for updating the propagation power at the VSAT;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
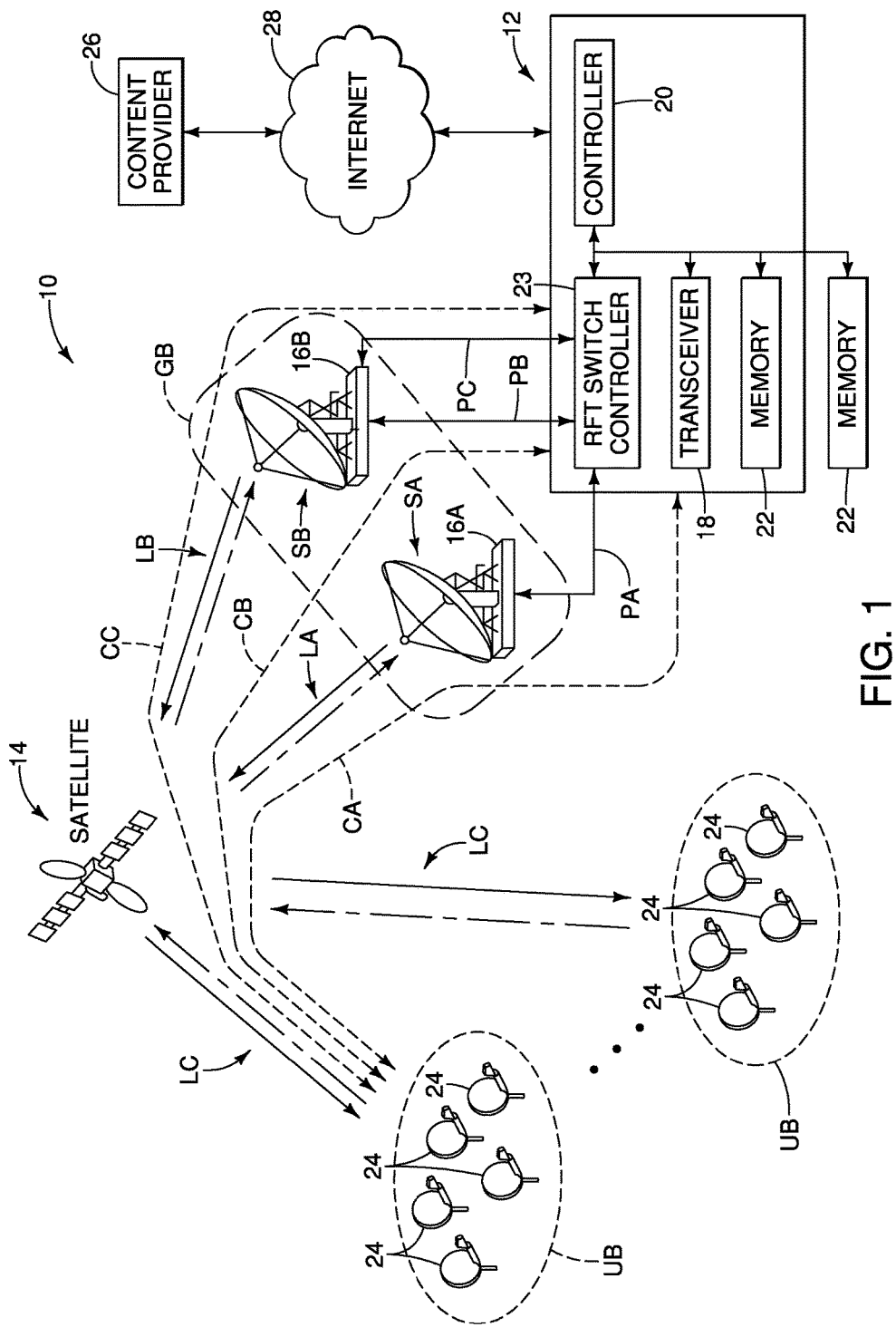
FIG. 1 illustrates an example of a satellite communication system according to one embodiment.

FIG. 1 illustrates an example of a satellite communication system 10 according to an exemplary embodiment. As shown in FIG. 1, the satellite communication system 10 includes a terrestrially mounted gateway 12 (e.g., a ground station), a first or primary radio frequency terminal (RFT) 16A (e.g., a first radio frequency transceiver), a second or backup radio frequency terminal (RFT) 16B (e.g., a second radio frequency transceiver or a radio frequency transceiver) and a plurality of communication terminals 24. The satellite communication system 10 forms a satellite communication network in which the gateway 12 and the communication terminals 24 communicate with each other through an orbiting satellite 14.

As shown in FIG. 1, the gateway 12 includes a transceiver 18, a controller 20 (e.g., an electronic controller), a memory 22, a RFT switch controller 23 (e.g., a diversity switch), and other types of equipment (not shown) such as amplifiers and so on as understood in the art on which enable communication between the gateway 12 and the communication terminals 24 via the satellites 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art. The RFT switch controller 23 includes an L-band switch or any other suitable type of switch as understood in the art.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

In the illustrated embodiment, the gateway 12 is connected to the first and second RFTs 16A and 16B. The first and second RFTs 16A and 16B each include an antenna dish that are mounted on an antenna frame and interconnected to a feed-horn. The feed-horn includes low noise amplifiers and down-converters for amplification and down conversion of the received signal, respectively. The feed-horn directs the transmitted power towards an antenna dish or collects the received power from the antenna dish. In the illustrated embodiment, the first and second RFTs 16A and 16B have duplicated equipment to provide equipment redundancy of the satellite communication system 10 in a cost effective manner.

In the illustrated embodiment, the first and second RFTs 16A and 16B are located at different RF sites SA and SB that can be deployed 50-100 kilometers apart from each other. In the illustrated embodiment, the RF site SA is collocated with the gateway 12. Specifically, the first RFT 16A is collocated with the gateway 12, and is connected to the gateway 12 through a first communication path PA. The first communication path PA includes an optical fiber cable or any other suitable type of link as understood in the art. The second RFT 16B is connected to the gateway 12 through second and third communication paths PB and PC (e.g., first and second terrestrial communication paths). The second and third communication paths PB and PC include optical fiber cables or any other suitable type of links, such as microwave links, as understood in the art. These second and third communication paths PB and PC address possible cable failure between the gateway 12 and the second RFT 16B. With this configuration, the satellite communication system 10 can utilize RF site diversity to combat localized rain fade and provide equipment redundancy. Specifically, in the illustrated embodiment, as illustrated in FIG. 1, the RFT switch controller 23 of the gateway 12 selects one of the first, second and third communication paths PA, PB and PC to select an active RFT from the first and second RFTs 16A and 16B, and thereby switch a satellite communication path between the gateway 12 and the communication terminals 24. In the illustrated embodiment, the phrase "RF site diversity" refers to not only switching between the first and second communication paths PA and PB or between the first and third communication paths PA and PC, which involves switching of an active RFT between the first and second RFTs 16A and 16B, but also switching between the second and third communication paths PB and PC, which does not involve switching of an active RFT (i.e., the same RFT (the second RFT 16B) is active).

The gateway 12, the satellite 14 and the communication terminals 24 typically communicate with each other over a radio frequency link, such as a Ku-band link, a Ka-band link or any other suitable type of link as understood in the art, which can generally be referred to as a space link. Specifically, in the illustrated embodiment, the first RFT 16A can establish a first space link LA between the satellite 14 and the first RFT 16A, while the second RFT 16B can establish a second space link LB between the satellite 14 and the second RFT 16B. Also, in the illustrated embodiment, the communication terminals 24 can each establish a third space link LC between the satellite 14 and the communication terminal 24. With this configuration, when the RFT switch controller 23 selects the first communication path PA, a first satellite communication path CA is established between the gateway 12 and the communication terminals 24 through the satellite 14. Specifically, the first satellite communication path CA includes the first communication path PA, the first space link LA and the third space link LC. On the other hand, when the RFT switch controller 23 selects the second communication path PB, a second satellite communication path CB is established between the gateway 12 and the communication terminals 24 through the satellite 14. Specifically, the second satellite communication path CB includes the second communication path PB, the second space link LB and the third space link LC. Furthermore, when the RFT switch controller 23 selects the third communication path PC, a third satellite communication path CC is established between the gateway 12 and the communication terminals 24 through the satellite 14. Specifically, the third satellite communication path CC includes the third communication path PC, the second space link LB, and the third space link LC. In the illustrated embodiment, as shown in FIG. 1, the gateway 12 can be configured as a network management center or network operating center which, among other things, operates to communicate with remote sites, such as web content providers 26, via the Internet 28, cloud storage, or other terrestrial data networks as understood in the art. With this configuration, the satellite communication system 10 can provide access to the Internet 28 to the users of the communication terminals 24.

The satellite 14 can be any suitable communications satellite for connecting the gateway 12 to the communication terminals 24. The satellite 14 can use small spot beams to optimize capacity and availability for user terminal and gateway access, with uplink and downlink frequencies reused between spot beams in a pattern to maximize capacity and coverage while minimizing cofrequency interference. The satellite 14 provides a gateway coverage by a gateway spot beam GB. In the illustrated embodiment, the first and second RFTs 16A and 16B are located within the range of the same gateway spot beam GB. Also, the satellite 14 provides a user terminal coverage by a plurality of user spot beams UB. In the illustrated embodiment, the communication terminals 24 are grouped into a plurality of terminal populations that are covered by the user spot beams UB, respectively.

Figure 2:
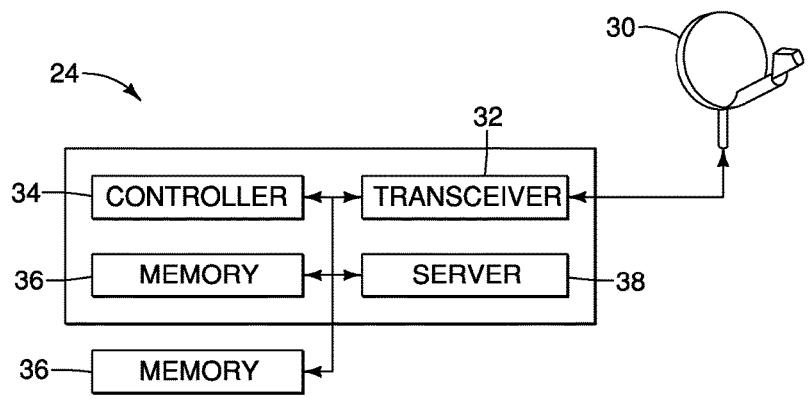
FIG. 2 illustrates further details of a very small aperture terminal (V SAT) of the satellite communication system shown in FIG. 1.

In the illustrated embodiment, the communication terminals 24 are each configured as a VSAT. Referring now to FIG. 2, the communication terminals 24 each typically include an antenna dish 30, a transceiver 32, a controller 34, a memory 36, a local server 38 and other types of equipment (not shown) such as amplifiers, waveguides and so on as understood in the art on which enable communication between the communication terminal 24 and the gateway 12 via the satellite 14. The transceiver 32 can include, for example, an integrated satellite modem and any other suitable equipment which enables the transceiver 32 to communicate with the satellite 14 as understood in the art. The memory 36 can be, for example, an internal memory in the communication terminal 24, or other type of memory devices such as a flash memory or hard drives with external high speed interface such as a USB bus or an SATA bus, or remote memories such as cloud storage and so on. These other types of memory can be present at the communication terminal 24 or accessible at a location apart from the communication terminal 24 via a network connection such as an Ethernet connection, a WiFi connection or any other suitable type of connection as understood in the art. Also, the local server 38 can communicate with an access point, such as a WAP or any other suitable device, which enables the local server 38 to provide packets to end user devices. Such end user devices include, for example, desktop computers, laptop or notebook computers, tablets, smart phones, Smart TVs and any other suitable devices as understood in the art. Naturally, the communications between the local server 38, the access point and the end user devices can occur over wireless connections, such as WiFi connections, as well as wired connections as understood in the art.

As with the controller 20 of the gateway 12, the controller 34 preferably includes a microcomputer with a control program that controls the communication terminal 24 as discussed herein. The controller 34 can also include other conventional components such as an input interface circuit, an output interface circuit, and storage devices such as a ROM (Read Only Memory) device and a RAM (Random Access Memory) device. The RAM and ROM store processing results and control programs that are run by the controller 34. The controller 34 is operatively coupled to the components of the communication terminal 24 as appropriate, in a conventional manner. It will be apparent to those skilled in the art from this disclosure that the precise structure and algorithms for the controller 34 can be any combination of hardware and software that will carry out the functions of the present invention.

Figure 3:
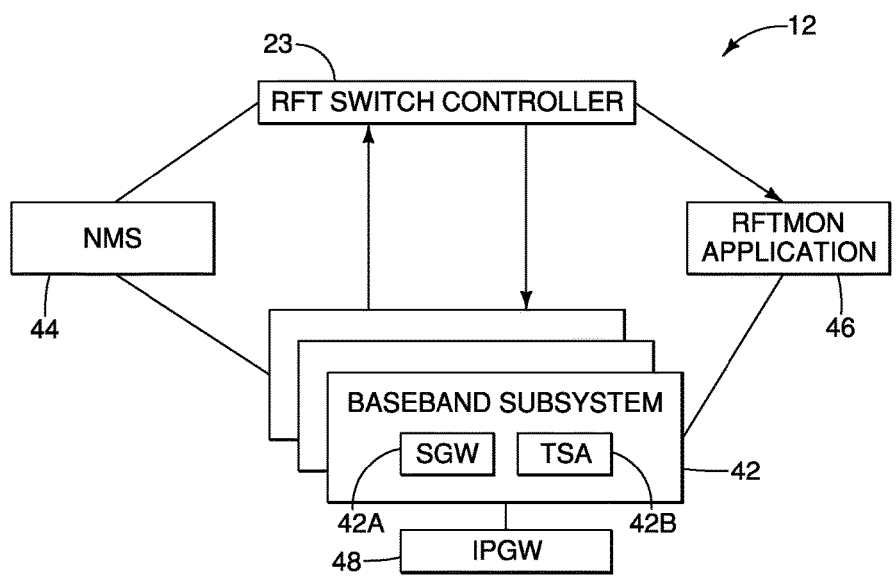
FIG. 3 illustrates further details of a satellite gateway of the satellite communication system shown in FIG. 1.

FIG. 3 illustrates further details pertaining to the gateway 12 for communicating in the satellite communication system 10. These components of the gateway 12 as shown in FIG. 3 can be carried out by the controller 20 or controllers 20 and their related hardware and software associated with the gateway 12 as can be appreciated by one skilled in the art. In the illustrated embodiment, the gateway 12 further includes a plurality of baseband subsystems 42, a network management system (NMS) 44, an RFTMon application 46 and an internet protocol gateway (IPGW) 48.

The baseband subsystems 42 each include a satellite gateway (SGW) 42A and a timing synchronization application (TSA) 42B. The SGW 42A estimates transport bandwidth based on, for example, modulation and coding and symbol rate of the packets being transmitted by the gateway 12 and of the packets being received by the gateway 12. The TSA 42B periodically broadcasts via the superframe numbering packets (SFNP) timing reference and synchronization to the communication terminals 24. The baseband subsystems 42 also host a modulator, a demodulator and a network layer equipment as understood in the art. The NMS 44 manages and maintains the operational status of various components of the gateway 12. The IGPW 48 determines traffic demands for each of the communication terminals 24 and requests bandwidth from the SGW 42A, and the SGW 42A performs bandwidth allocations to the IPGW 48. Basically, with this configuration, the gateway 12 allows the communication terminals 24 to access the web content provider 26 via the Internet 28. The RFTMon application 46 monitors the switching operation of the RFT switch controller 23. The detailed operations of the TSA 42B and the RFTMon application 46 in regards to the RF site diversity will be described later in detail.

Referring now to FIGS. 4 to 7B, a propagation parameter update process of the satellite communication system 10 (e.g., satellite communication method) in response to the RF site diversity will be described.

As mentioned above, in the illustrated embodiment, the satellite communication system 10 executes the RF site diversity by selecting a new satellite communication path from among the first, second and third satellite communication paths CA, CB and CC. In other words, in the illustrated embodiment, the satellite communication system 10 executes the RF site diversity by switching the satellite communication path from an "old satellite communication path" to a "new or target satellite communication path". This RF site diversity changes the network characteristics or parameters, such as network delay, network attenuation and the like, of the satellite communication path between the gateway 12 and the communication terminals 24. Specifically, the satellite communication path between the gateway 12 and the communication terminals 24 can be either through the first RFT 16A, which is collocated with the gateway 12, or through the second RFT 16B. Switching the satellite communication path can introduce step changes in the network delay and the network attenuation in both forward and return paths. These step changes generally occur due to one or a combination of multiple factors, for example: (a) difference in propagation distance and path loss (cables and switches) between a gateway and respective diverse RF sites; (b) difference in antenna and/or HPA (High Power Amplifier) sizes deployed at respective diverse RF sites; (c) difference in propagation characteristics from respective diverse RF sites to a satellite, such as center versus edge of beam, or satellite antenna pattern effects; and (d) difference in propagation loss through the payload for respective diverse RF sites, for example, through switches in case the respective RF sites are located in different spot beams (see FIG. 8, for example).

In the illustrated embodiment, once the RF site diversity occurs, the communication terminals 24 start an initiation process for adjusting the propagation parameter, such as propagation timing (return link timing), propagation power (return link transmit power) and the like, for return transmission through the new satellite communication path. On the other hand, in the illustrated embodiment, the gateway 12 advertises an offset value of the network parameter, such as network delays, network attenuations and the like, of the old and new satellite communication paths. Then, the communication terminals 24 apply the offset value of the network parameter to update the propagation parameter for the return transmission. Specifically, in the illustrated embodiment, the communication terminals 24 stop the initiation process, and update the propagation parameter in response to receiving the offset value of the network parameter. Thus, in the illustrated embodiment, the communication terminals 24 can establish the communication with the gateway 12 based on the offset value received through the new satellite communication path, and does not need to complete the initiation process for the return transmission. Thus, in the illustrated embodiment, the convergence of the propagation parameter, such as the propagation timing and the propagation power, to compensate for any differences of the network parameter, such as the network delay and the network attenuation, can be optimized.

In the illustrated embodiment, the RFT switch controller 23 executes a physical switch for the RF site diversity (hereinafter "RFT switch"). Specifically, depending on the network architecture, either or both of two modes of the RFT switch can exist: an automatic RFT switch mode and a manual RFT switch mode. The automatic RFT switch mode is triggered by the RFT switch controller 23. Specifically, the automatic RFT switch mode employs an application at the gateway 12 that provides for an application programming interface (API) to the RFT switch controller 23 through which the RFT switch is automatically triggered. Through the interface, a new or target satellite communication path to which the RFT switch has to occur can be indicated. For example, the new satellite communication path is indicated through the interface for the RF site diversity when the satellite communication path is switched from the old satellite communication path to the new satellite communication path. Of course, alternatively, a new or target RFT to which the RFT switch has to occur can be indicated. For example, this automatic switch decision can be integral and controlled from the RF system based on a pilot or uplink power control system, or can be integral and controlled from the baseband system based on metrics derived from or signaled by the RF system to the baseband system. On the other hand, with the manual RFT switch mode, the operator is required to manually trigger the RFT switch in either or both of the RF system or the baseband system via the NMS 44.

When the automatic RFT switch mode is controlled from the baseband system, pre-notification option can be available that notifies the communication terminals 24 and the IPGW 48 of a time of the day when the RFT switch will occur (scheduled switch time) based on some defined metrics. One of the metrics can be a weather forecast. The pre-notification with the time is sent from the gateway 12 to the communication terminals 24 via the superframe numbering packets (SFNP). Gateway internal message does the same for the IPGW 48. This allows for improved streamlining of the switch related events with less ambiguity. For example, the offset value of the network parameters (network delay or network attenuation) between two satellite communication paths (when switching from one satellite communication path to the other satellite communication path) are sent to the communication terminals 24 a few seconds or other predetermined time before the scheduled switch time. When the scheduled switch time has reached, then the communication terminals 24 stops transmitting until the changed or new network parameters for adjusting the propagation timing and propagation power are received. Furthermore, for example, when the scheduled switch time has been reached, then the IPGW 48 can stop sending traffic over the old satellite communication path and buffers or drops incoming traffic depending on the traffic characteristics during the time when the currently used RFT (i.e., an old RFT) is shut down and the other RFT (i.e., a new RFT) starts up. As soon as the new RFT is unmuted, the IPGW 48 resumes forward link traffic.

Figure 4:
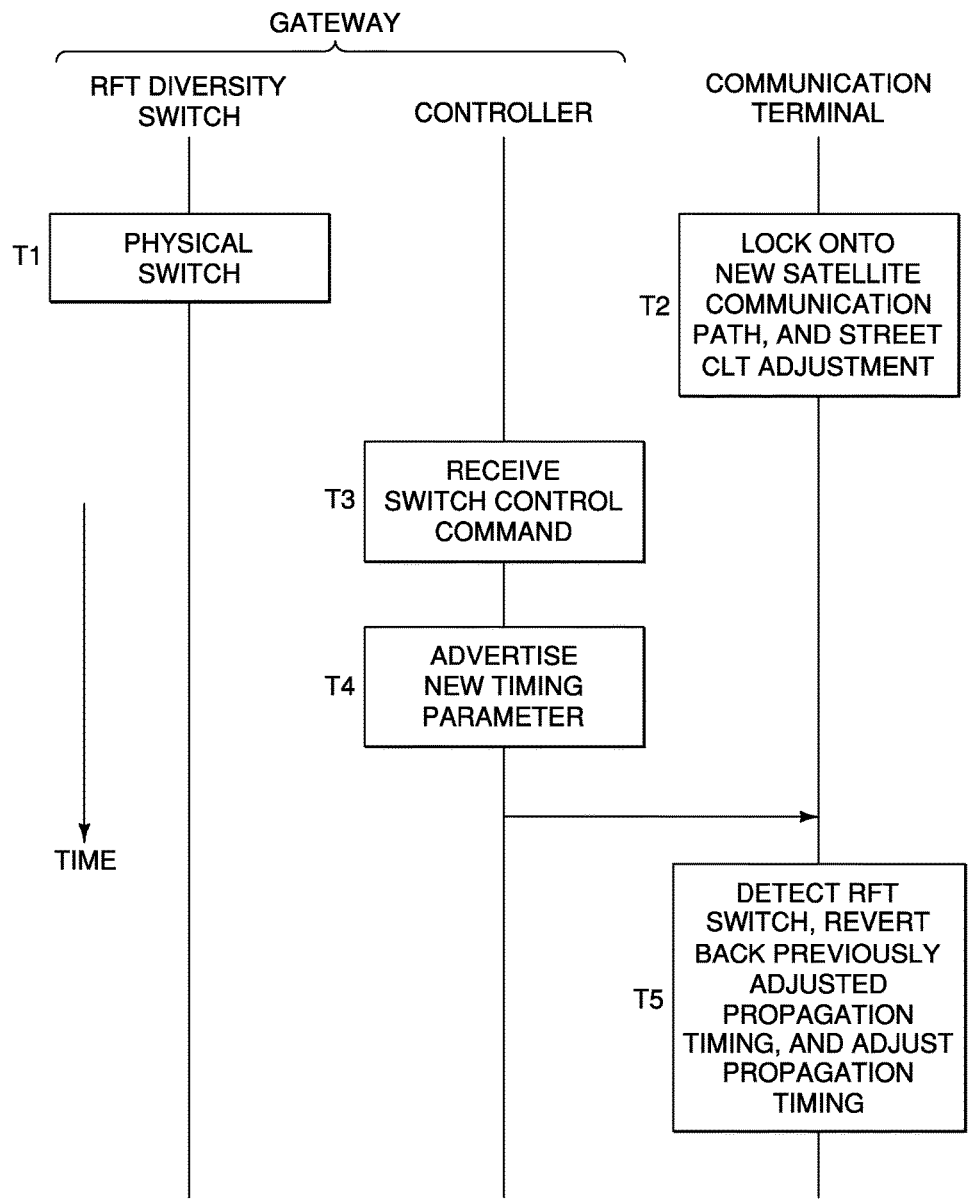
FIG. 4 is a timing chart showing a propagation parameter update process for updating a propagation timing in the satellite communication system shown in FIG. 1.

Referring now to FIGS. 4, 5A and 5B, the propagation parameter update process for updating the propagation timing in response to the RF site diversity will be described.

As shown in FIG. 4, at time T1, the RFT switch controller 23 executes a physical switch for the RF site diversity ("RFT switch") (step S12 in FIG. 5A). For example, the RFT switch controller 23 triggers the automatic RFT switch. As shown in FIG. 3, the RFT switch controller 23 can be a part of RFT system, and has network connectivity with the RFTMon application 46 at the gateway 12. The RFTMon application 46 is interconnected with the baseband subsystem 42. In the illustrated embodiment, the RFTMon application 46 provides for an application programming interface (API) that accepts the switch control command (control messages) from the RFT switch controller 23. The switch control command indicates to the RFTMon application 46 that the RFT switch has happened. The switch control command also indicates the new satellite communication path (with the new target RFT) to which the RFT switch has occurred. The RFTMon application 46 processes the switch control command, and informs the TSA 42B of the baseband subsystem 42 about the RFT switch so that TSA 42B can advertise the impending path delay change to the communication terminals 24. However, it takes a few seconds for the RFT switch controller 23 to send the switch control command to the RFTMon application 46 at the gateway 12. Specifically, as shown in FIGS. 4 and 5A, although the RFT switch takes place at time T1, the RFTMon application 46 receives the switch control command at time T3 (step S14 in FIG. 5A).

The TSA 42B periodically broadcasts via the superframe numbering packets (SFNP) a current or new timing parameter that includes a round trip gateway to satellite delay along the new (currently active) satellite communication path (through the currently active RFT), a new timing offset of network delays along the old and new satellite communication paths (through the old and new RFTs), and the identifier of the new (currently active) satellite communication path (or identifier of the currently active RFT) to the communication terminals 24. However, as mentioned above, it takes a few seconds for the RFT switch controller 23 to send the switch control command to the RFTMon application 46 at the gateway 12. Thus, the TSA 42B continues to broadcast an old timing parameter that includes a round trip gateway to satellite delay along the old satellite communication path, an old timing offset, and the identifier of the old satellite communication path to the communication terminals 24 until the RFTMon application 46 informs the TSA 42B about the RFT switch after the RFT switch physically occurs.

In the meantime, as shown in FIG. 4, at time T2 before time T3, the communication terminals 24 lose lock with the old satellite communication path (with the old RFT), and lock onto the new satellite communication path (with the new RFT) (step S22 in FIG. 5B). However, at this point, the communication terminals 24 are unaware of the RFT switch. As mentioned above, although the RFT switch has physically occurred, the TSA 42B has not yet been commanded to broadcast the new timing parameter. Thus, the communication terminals 24 lose timing synchronization with the gateway 12, and the bursts fall outside of the burst aperture. To recover the timing synchronization, at time T2, the communication terminals 24 start the initiation process (step S22 in FIG. 5B). Specifically, the communication terminals 24 start closed loop timing (CLT) adjustment in which the communication terminals 24 send the bursts on a large aperture to get timing correction feedback from the gateway 12, and adjust propagation timing for the return transmission using the feedback correction.

In this initiation process, the communication terminals 24 calculates an adjustment of propagation timing as a cumulative CLT adjustment $\Delta_{CLT}$ between the time when the communication terminals 24 lock onto the new satellite communication path (with the new RFT) (detected by an event of outroute unlock) (e.g., time T2) and when the communication terminals 24 receive the first SFNP from the TSA 42B that indicates the RFT switch (e.g., time T5).

As mentioned above, the TSA 42B periodically broadcasts via the superframe numbering packets (SFNP) the current or new timing parameter that includes the round trip gateway to satellite delay along the new (currently active) satellite communication path (through the currently active RFT), the new timing offset of network delays along the old and new satellite communication paths (through the old and new RFTs), and the identifier of the new (currently active) satellite communication path (or identifier of the currently active RFT) to the communication terminals 24. For example, when the RFT switch from the first satellite communication path CA (through the first RFT 16A) to the second satellite communication path CB (through the second RFT 16B) has occurred, then the new timing offset Toffset$_{RFT2}$ is calculated based on the following equation:

$$Toffset_{RFT2} = (NomD_{RFT2} + CableD_{RFT2} - NomD_{RFT1})$$

where NomD$_{RFT1}$ represents a nominal round trip satellite delay from the first RFT 16A, which is collocated with the gateway 12, NomD$_{RFT2}$ represents a nominal round trip satellite delay from the second RFT 16B, and CableD$_{RFT2}$ represents a round trip propagation delay through the cable and switches of the second communication path PB that connects the second RFT 16B to the gateway 12. Here, the nominal satellite delay represents the network delay when the satellite 14 is at the center of the station keeping box.

In the illustrated embodiment, the operator can configure the round trip gateway to satellite delay for each satellite communication paths CA, CB and CC in advance. Specifically, in the illustrated embodiment, the round trip gateway to satellite delay can be calculated and/or measured based on the locations of the RFTs 16A and 16B in advance by assuming the satellite 14 at the center of the station keeping box. Furthermore, as mentioned above, for the second RFT 16B that is not collocated with the gateway 12, the difference in the round trip propagation delay CableD$_{RFT2}$ through the cable and switches of the second communication path PB is also accounted for the total delay. On the other hand, for the first RFT 16A, the difference in the round trip propagation delay through the cable and switches of the first communication path PA is ignored since the first RFT 16A is collocated with the gateway 12. However, of course, the difference in the round trip propagation delay through the cable and switches of the first communication path PA can be also accounted for the total delay. Furthermore, in the illustrated embodiment, the second RFT 16B is connected to the gateway 12 through the second and third communication paths PB and PC with different delays. Thus, an accurate timing offset can be calculated and advertised even when the RFT switch switches between the second satellite communication path CB and the third satellite communication path CC.

With this configuration, when the RFT switch from the first satellite communication path CA to the second satellite communication path CB has occurred (i.e., when the second RFT 16B is activated), for example, then the new timing offset Toffset$_{RFT2}$ is advertised by the TSA 42B. On the other hand, when the RFT switch from the second satellite communication path CB to the first satellite communication path CA has occurred (i.e., when the first RFT 16A is activated), then the negative value of Toffset$_{RFT2}$ is advertised by the TSA 42B as the new timing offset Toffset$_{RFT1}$.

$$Toffset_{RFT1} = -Toffset_{RFT2}$$

In the illustrated embodiment, as shown in FIGS. 4 and 5A, the RFTMon application 46 receives the switch control command from the RFT switch controller 23, and informs the TSA 42B about the RFT switch at time T3. Then, the TSA 42B starts advertising the new timing parameter that includes the round trip gateway to satellite delay along the new satellite communication path (through the currently active RFT), the new timing offset of the network delays along the old and new satellite communication paths (through the old and new RFTs), and the identifier of the new satellite communication path (or identifier of the currently active RFT) to the communication terminals 24 at time T4 (step S16 in FIG. 5A). In the illustrated embodiment, the TSA 42B periodically broadcasts the new timing parameter to the communication terminals 24 with an interval of 360 ms, for example.

As illustrated in FIGS. 4 and 5B, when the communication terminals 24 receive a broadcast message from the TSA 42B that contains the new timing parameter and indicates the RFT switch, then the communication terminals 24 extract the new timing parameter from the broadcast message at time T5. Specifically, the communication terminals 24 determine whether the RFT switch happens (step S24 in FIG. 5B). If the communication terminals 24 determine that the RFT switch happens based on the broadcast message from the TSA 42B (YES in step S24), then the communication terminals 24 revert back to the previously adjusted propagation timing before starting the CLT adjustment, which was obtained using the old timing offset, for example. Specifically, the communication terminals 24 revert back to the previously adjusted propagation timing that was performed previously as follows:

$$\Delta_{TRO} = \Delta_{TRO} - \Delta_{CLT}$$

where $\Delta_{TRO}$ represents the cumulative timing adjustment at the communication terminals 24, and $\Delta_{CLT}$ represents the cumulative CLT adjustment (step S26 in FIG. 5B). In other words, the communication terminals 24 subtract the cumulative CLT adjustment $\Delta_{CLT}$ from the current cumulative timing adjustment $\Delta_{TRO}$ to obtain the previously adjusted propagation timing (the cumulative timing adjustment $\Delta_{TRO}$).

Furthermore, the communication terminals 24 further adjust the cumulative timing adjustment $\Delta_{TRO}$ (e.g., the propagation timing or return link timing) using the new timing offset Toffset$_{RFTn}$ received in the broadcast message from the TSA 42B as follows:

$$\Delta_{TRO} = \Delta_{TRO} - Toffset_{RFTn}$$

where $Toffset_{RFTn}$ represents the new timing offset for n-th RFT (the first RFT 16A or the second RFT 16B in the illustrated embodiment).

The polarity of $Toffset_{RFTn}$ depends on whether the round trip gateway to satellite delay of the new satellite communication path (through the new RFT) (including the round trip propagation delay for the second RFT 16B that is not collocated with the gateway 12) is larger or smaller than that of the old satellite communication path (through the old RFT). Specifically, in the illustrated embodiment, the new timing offset is the positive or negative difference in time through the satellite 14 through the new RFT versus the old RFT, including the terrestrial link and satellite propagation time differences.

Subsequently, the communication terminals 24 apply the cumulative timing adjustment $\Delta_{TRO}$ for the return transmission from the communication terminals 24 to the gateway 12. In particular, the return transmission (e.g., TDMA (Time Division Multiple Access) return channel transmitted bursts) from the communication terminals 24 properly falls within the burst apertures at the gateway 12, and is detected by the demodulators at the gateway 12. With this configuration, upon receiving the broadcast message that indicates the RF switch, the communication terminals 24 can optimize or accelerate the convergence of the propagation timing adjustment by not requiring all affected communication terminals 24 in the satellite communication system 10 to engage in another costly CLT adjustment. Note that although described here for TDMA return channel transmitted bursts, the methods disclosed are applicable to other return channel access methods and are not intended to be limited to TDMA.

As mentioned above, the RFT or cable path is physically switched before the gateway 12 advertises the new timing offset to the communication terminals 24. The communication terminals 24 lock on the forward and return links of the new satellite communication path (through the new RFT). However, the communication terminals 24 continue to receive the old timing offset corresponding to the old satellite communication path (or the old RFT) until the new timing offset arrives. This discrepancy may last for 2-3 seconds after the time of the physical switch, by which time many or all of the communication terminals 24 already have started the CLT adjustment with the gateway 12 before the new and correct timing offset has been advertised. This propagation timing adjustment using the old timing offset is not correct as the old timing offset does not match the actual new physical network delay. If the communication terminals 24 again go through the CLT adjustment after receiving the new timing offset, disruption of the communication along the return path is extended. Furthermore, the events of a pre-advertisement timing step change and a subsequent advertised timing step change will tend to synchronize the CLT adjustment signaling across the communication terminals 24 such that the CLT adjustment may be extended for beams with a large number of communication terminals 24. This further extends the disruption to traffic by the RF site diversity.

On the other hand, in the illustrated embodiment, a satellite communication method for quick convergence of the propagation timing adjustment for the return transmission in case of the RF site diversity can be provided. Specifically, in the illustrated embodiment, the communication terminals 24 save or retrieve the previous or recent CLT-derived delay values (i.e., the previously adjusted propagation timing). When the new and correct timing offset is advertised, then the communication terminals 24 uses the new advertised timing offset with the previously adjusted propagation timing without requiring another round of the CLT adjustment relative to the gateway 12. In other words, the communication terminals 24 truncate any ongoing CLT adjustment. This reversion to the previously adjusted propagation timing and coupling with the new timing offset enable the communication terminals 24 to immediately transmit with proper propagation timing such that the TDMA return channel transmitted bursts through the new satellite communication path fall inside the burst apertures of the demodulator at the gateway 12.

In the illustrated embodiment, the satellite communication system 10 supports the return link timing adjustment for the RF site diversity by having the gateway 12 advertise on the forward link the new timing offset to be applied by the communication terminals 24 for return transmissions when the RFT switch happens.

Figure 6:
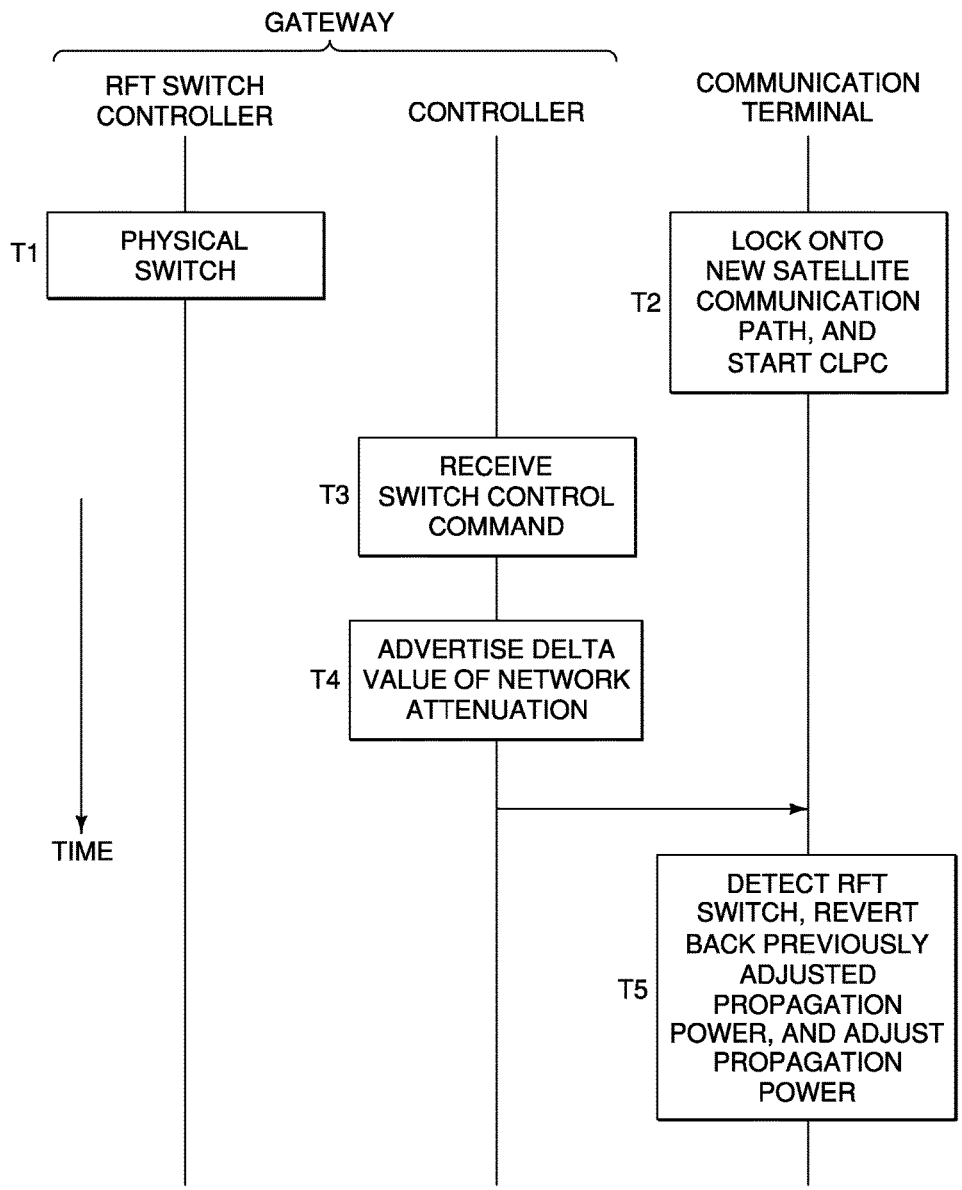
FIG. 6 is a timing chart showing a propagation parameter update process for updating a propagation power in the satellite communication system shown in FIG. 1.

Referring now to FIGS. 6, 7A and 7B, the propagation parameter update process for updating the propagation power in response to the RF site diversity will be described.

Basically, differences in power attenuation due to different antenna sizes, gain performance values, power amplifiers, and/or terrestrial or satellite path effects require the communication terminals 24 to adjust the propagation power (power level) for the return transmission for various reasons.

For example, when an RFT switch that introduces more propagation loss from the satellite 14 to the demodulators of the gateway 12, such as an RFT switch from large to small antenna or across a satellite or terrestrial path causing more power attenuation, occurs, then the bursts from the communication terminals 24 are unable to get through and the communication terminals 24 are unable to receive get immediate power control feedback from the gateway 12 after the RFT switch. If the communication terminals 24 do not receive the power control feedback, then the communication terminals 24 take time to boost propagation power to a level so that the bursts can be detected by the demodulators of the gateway 12. This leads to a longer duration of traffic disruption across the RF site diversity.

Furthermore, for example, when an RFT switch that introduces less propagation loss from the satellite 14 to the demodulators of the gateway 12, such as an RFT switch from small to large antenna or across a satellite or terrestrial path loss causing less power attenuation, occurs, then the communication terminals 24 can initially send the bursts with high power than the normal after the RFT switch. This can also cause the bursts to not be detected, or cause adjacent channel interference affecting other communication terminals 24. This potentially leads to an extended power control feedback and longer duration traffic disruption due to the RF site diversity.

Thus, in the illustrated embodiment, the above-mentioned power control feedback related issue is addressed by having the gateway 12 advertise a delta value (e.g., offset value) of the network attenuation of the old and new satellite communication paths according to switching of the first, second and third satellite communication paths CA, CB and CC. The delta value is either automatically measured, or is configured in the satellite communication system 10. The delta value is broadcasted to the communication terminals 24 via the forward link from the gateway 12. The communication terminals 24 adjust the propagation power for the return transmission using the advertised delta value, and transmit TDMA bursts on the return transmission with the adjusted propagation power. Additionally, similarly to the propagation parameter update process for updating the propagation timing, the communication terminals 24 implement closed loop power control (CLPC), and save recent propagation power control history so as to quickly arrive at an optimal coupling of the advertised delta value and the CLPC-derived propagation power. This can avoid dual convergence processes (i.e., dual CLPCs), and truncate any ongoing CLPC by immediately arriving at an appropriate propagation power. This will expedite inroute power control convergence in case of the RF site diversity. Note that although described here for TDMA bursts, the methods disclosed are applicable to other return channel access methods and are not intended to be limited to TDMA.

Referring now to FIG. 6, at time T1, the RFT switch controller 23 physically executes the RFT switch (step S32 in FIG. 7A). This RFT switch in step S32 is the same as the RFT switch in step S12 in FIG. 5A, and thus will not be described again.

In the meantime, at time T2, the communication terminals 24 lose lock with the old satellite communication path, and lock onto the outroute of the new satellite communication path (through the new or switched RFT). Then, the communication terminals 24 start the initiation process (step S42 in FIG. 7B). Specifically, the communication terminals 24 perform the CLPC to compensate for different network attenuation between the old satellite communication path and the new satellite communication path. In this initiation process, the communication terminals 24 calculates an adjustment of propagation power as a cumulative CLPC adjustment $\Delta_{CLPC}$ between the time when the communication terminals 24 lock onto the new satellite communication path (with the new RFT) (e.g., time T2) and when the communication terminals 24 receive the first SFNP from the TSA 42B that indicates the RFT switch (e.g., time T5). Based on the event timing, this initiation process cannot be completed at the communication terminals 24 before receiving the delta value of the network attenuation through the RFT switch indicator from the TSA 42B.

Furthermore, at time T3, the RFTMon application 46 receives the switch control command (step S34 in FIG. 7A). The reception of the switch control command in step S34 is the same as the reception of the switch control command in step S14 in FIG. 5A, and thus will not be described again. When the RFTMon application 46 receives the switch control command from the RFT switch controller 23, then the RFTMon application 46 informs the TSA 42B about the RFT switch at time T3.

Then, at time T4, the TSA 42B starts advertising the delta value of the network attenuation through the superframe numbering packets (SFNP). Specifically, the TSA 42B periodically broadcast via the superframe numbering packets (SFNP) the receive signal-to-noise ratio (SINR) difference $\Delta_{ES/No}$ dB between the old satellite communication path and the new satellite communication path at clear sky condition as the delta value of the network attenuation. Specifically, the SINR for the each satellite communication paths CA, CB and CC can be calculated and/or measured in advance. Similarly to the propagation parameter update process for updating the propagation timing, TSA 42B can also advertise the identifier of the new (currently active) satellite communication path (or identifier of the currently active RFT) to the communication terminals 24.

Furthermore, at time T5, the communication terminals 24 receive the broadcast message from the TSA 42B that indicates the RFT switch, and extract the delta value of the network attenuation from the broadcast message. Specifically, the communication terminals 24 determines whether the RFT switch happens (step S44 in FIG. 7B). If the communication terminals 24 determines that the RFT switch happens based on the broadcast message from the TSA 42B (YES in step S44), then the communication terminals 24 revert back to the previously adjusted propagation power before starting the CLPC. Specifically, the previously adjusted propagation power is obtained as follows:

$$P_C = P_C - \Delta_{CLPC}$$

where $P_C$ represents the current propagation power at the communication terminals 24, and $\Delta_{CLPC}$ represents the cumulative CLPC adjustment (step S46 in FIG. 7B). In other words, the communication terminals 24 subtracts the cumulative CLPC adjustment $\Delta_{CLPC}$ from the current propagation power $P_C$ to obtain the previously adjusted propagation power.

Furthermore, the communication terminals 24 adjust the propagation power $P_C$ using the delta value of the network attenuation (SINR difference $\Delta_{ES/No}$) received in the broadcast message from the TSA 42B as follows:

$$P_C = P_C - \Delta_{ES/No}$$

With this configuration, the communication terminals 24 obtain the propagation power $P_C$ for the return transmission for the new satellite communication path.

In the illustrated embodiment, the communication terminals 24 can perform a ranging process in a clear sky condition, and create a ranging record of the base attenuation (transmit power) and corresponding Es/No at different symbol and FEC (Forward Error Correction) rates. The ranging process is done at the time of installation and commissioning through one of the first, second and third satellite communication paths CA, CB and CC that was active at the time of installation. The communication terminals 24 can derive the ranging record corresponding to other satellite communication paths (other RFTs) by using the delta value advertised by the gateway 12. Therefore, the communication terminals 12 maintain separate ranging records for different satellite communication paths CA, CB and CC (for different RFTs). The appropriate ranging record is read by the communication terminals 24 for initial bursts transmission when the RFT switch occurs before the closed loop power control (CLPC) starts.

In the illustrated embodiment, the satellite communication system 10 can support opportunistic ranging process for the communication terminals 24 to physically range on the satellite communication path (RFT) that was not active during commissioning of the communication terminals 24, but that is now active. The communication terminals 24 can initiate the opportunistic ranging process during an idle traffic period and in a clear sky condition. In this case, the communication terminals 24 does not need to use the derived ranging record from the advertised delta value from the gateway 12 since the information from the actual ranging process is more accurate.

In the illustrated embodiment, once the communication terminals 24 receive the delta value of the network attenuation, the communication terminals 24 truncate any ongoing CLPC. Without this configuration, the communication terminals 24 perform dual convergence processes. One process is via CLPC when the communication terminals 24 lock onto the new satellite communication path (through the new or switched RFT), and the other process is adjustment of propagation power based on the advertised delta value by the gateway 12. Also, the second process can begin before the first process is complete. This will certainly waste attenuation or power with which the communication terminals 24 transmit on the return channel out of the required range. Then, all of the communication terminals 24 would lose transmission and engage in another CLPC, which results in significant traffic disruption. On the other hand, with the configuration of the present disclosure, such significant traffic disruptions during the RF switch can be prevented.

In the illustrated embodiment, the communication terminals 24 implement the CLPC. However, the present disclosure is not limited to this configuration. The satellite communication system 10 can support open loop power control (OLPC) for optimization of the propagation power for the return transmission rather than, or in addition to, the CLPC. For example, the communication terminals 24 can be programmed to adjust the propagation power for the return transmission when the forward path power level is changed. Specifically, in this case, it is assumed that the change in the forward path power level implies weather effects (e.g., rain fade) that also cause attenuation for the return transmission, and therefore merits the adjustment of the propagation power for the return transmission. With this configuration, the gateway 12 can adjust the delta value of the network attenuation so that the communication terminals 24 can unambiguously differentiate how to appropriately respond to the RFT switch and the weather effects.

Figure 8:
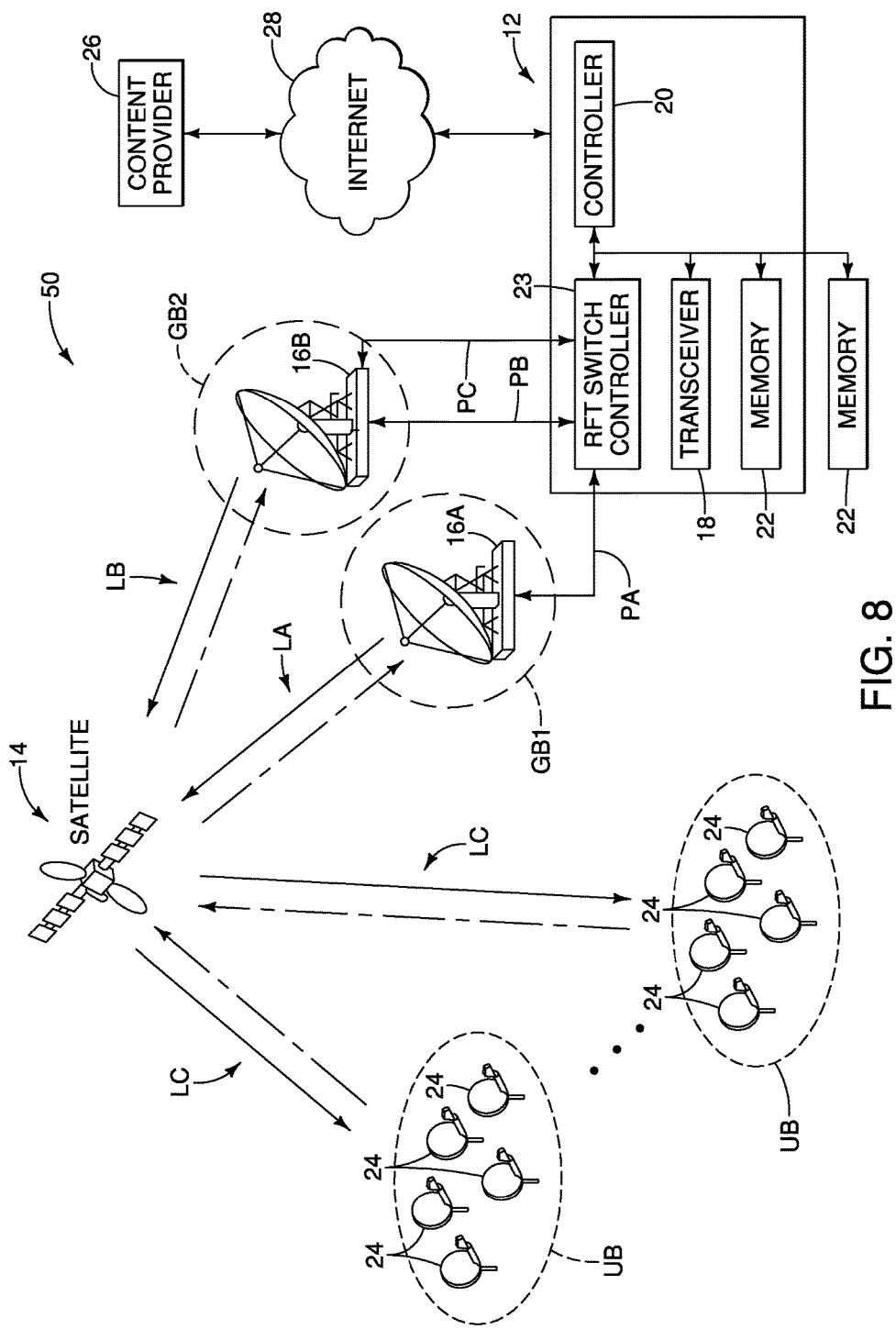
FIG. 8 illustrates another example of a satellite communication system.

In the illustrated embodiment, the first and second RFTs 16A and 16B are located within the range of the same gateway spot beam GB. However, the present disclosure is not limited to this configuration. As shown in FIG. 8, with a satellite communication system 50, the first and second RFTs 16A and 16B can be located within different gateway spot beams GB1 and GB2. With smart switching capability in digital payload satellite, the uplink from a set of user spot beams can be simultaneously switched to two gateway spot beams GB1 and GB2, and vice-versa. This is referred to as beam multicast. With this configuration, different propagation loss through the payload for the respective diverse RF sites are observed. However, the communication terminals 24 can properly update the propagation timing and/or power based on the offset value of the network delay and/or network attenuation advertised from the gateway 12 in the above-mentioned manner.

Figure 9:
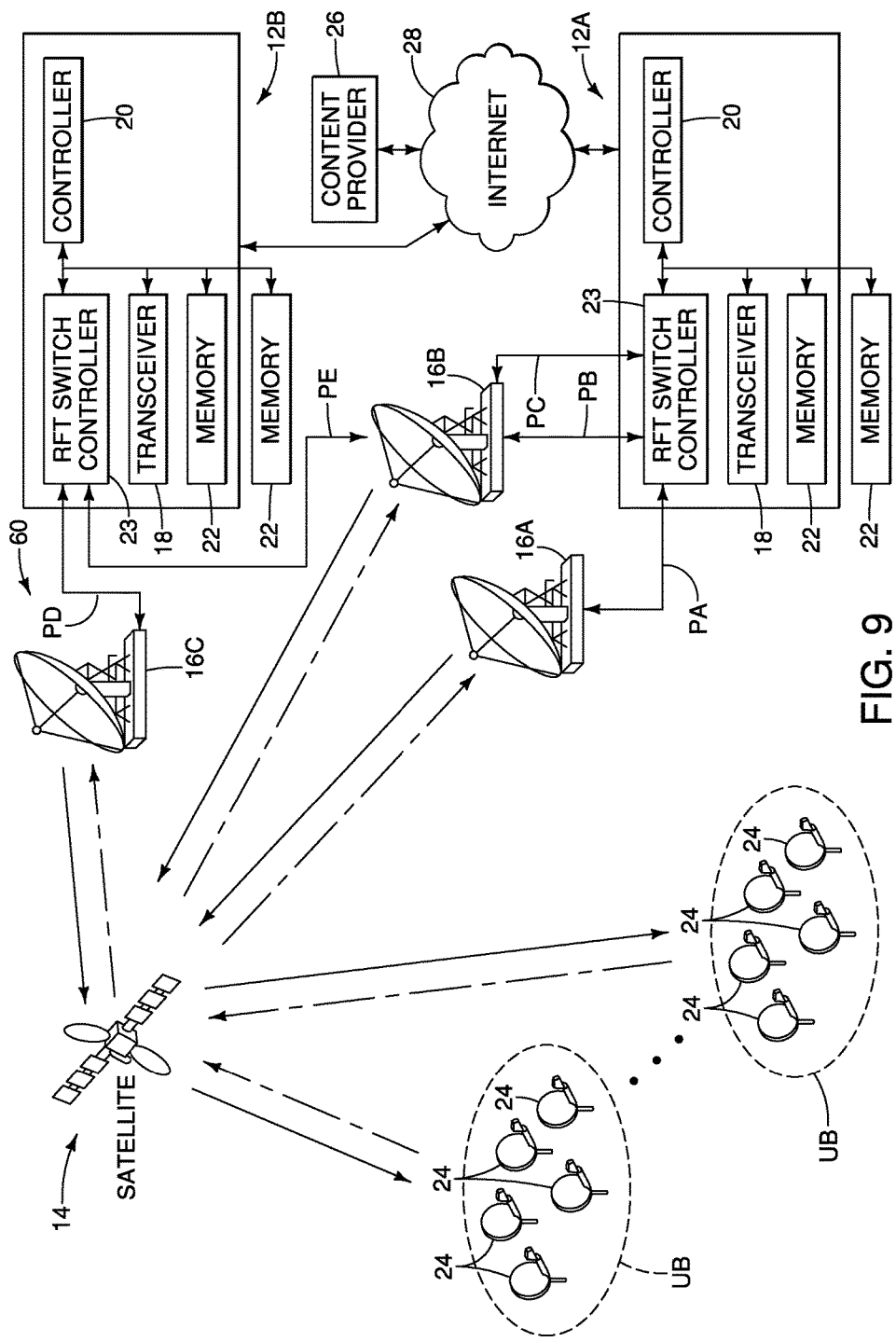
FIG. 9 illustrates yet another example of a satellite communication system.

Furthermore, as shown in FIG. 9, with a satellite communication system 60, it is also possible that a single diverse RF site (the second RFT 16B in FIG. 9) is shared among multiple gateways 12A and 12B. Specifically, in this example, the gateways 12A and 12B have the same configuration as the gateway 12 shown in FIG. 1. Propagation timing and propagation power also differ in this configuration in which a single diverse RF site (the second RFT 16B) is shared among the gateways 12A and 12B. With this satellite communication system 60, configurable switching can be installed at the diverse RF sites (first, second and third RFT 16A, 16B and 16C), and automatically controlled to select among communication paths (communication paths PA to PE) to the gateways 12. In such a configuration, it is likely that the communication path from the diverse RF sites to the various gateways 12A and 12B will differ, and that the network characteristics from the diverse RF sites (e.g., the second RFT 16B) to the satellite 14 will differ from the network characteristics from the first and third RFTs 16A and 16C that are collocated with the gateways 12A and 12B, respectively, to the satellite 14. However, the communication terminals 24 can properly update the propagation timing and/or power based on the offset value of the network delay and/or network attenuation advertised from the gateways 12A and 12B in the above-mentioned manner.

Furthermore, the satellite communication system can also employ any number of gateways and RFT sites, and is applicable to optimize operation for redundant gateway configurations, that is, configurations in which a redundant/diverse site includes both RF and baseband system, and the baseband system of the gateway is also bypassed in case of the RFT switch. These techniques are applicable whether such a redundant gateway configuration is a 1:1 redundancy configuration (i.e., one redundant/diverse site providing redundancy and path diversity for one gateway), or a 1:N redundancy configuration (i.e., one redundant/diverse site providing redundancy and path diversity for multiple gateways).

In the illustrated embodiment, the satellite communication system 10 includes the communication terminal 24 and the gateway 12 (e.g., the ground station). The gateway 12 is configured to communicate with the communication terminals 24 through the satellite communication path (CA, CB or CC) between the gateway 12 and the communication terminal 24 via the satellite 14. The gateway 12 includes the RFT switch controller 23 (e.g., the diversity switch) and the controller 20 (e.g., the electronic controller). The RFT switch controller 23 is configured to switch the satellite communication path (CA, CB or CC) from the old satellite communication path (e.g., the first satellite communication path) to the new satellite communication path (e.g., the second satellite communication path) different from the old satellite communication path. The controller 20 is configured to transmit the offset value (the delta value) of the network parameters of the old and new satellite communication paths to the communication terminals 24 through the new satellite communication path. The communication terminals 24 are configured to update the propagation parameter for communication with the gateway 12 based on the offset value in response to receiving the offset value through the new satellite communication path.

With the satellite communication system 10, the communication terminals 24 are further configured to start the initiation process for adjusting the propagation parameter to establish communication with the gateway 12 through the new satellite communication path prior to receiving the offset value through the new satellite communication path. The communication terminals 24 are further configured to stop the initiation process and update the propagation parameter based on the offset value in response to receiving the offset value through the new satellite communication path.

With the satellite communication system 10, the communication terminals 24 are further configured to update the propagation timing (the propagation power) (e.g., the propagation parameter) based on the previously adjusted propagation timing (the previously adjusted propagation power) (e.g., the propagation parameter before starting the initiation process) and the offset value in response to receiving the offset value through the new satellite communication path.

With the satellite communication system 10, the communication terminals 24 are further configured to store the cumulative CLT adjustment $\Delta_{CLT}$ (the cumulative CLPC adjustment $\Delta_{CLPC}$) (e.g., the adjustment value of the propagation parameter) during the initiation process. The communication terminals 24 are further configured to calculate the previously adjusted propagation timing (the previously adjusted propagation power) based on the cumulative CLT adjustment $\Delta_{CLT}$ (the cumulative CLPC adjustment $\Delta_{CLPC}$) in response to receiving the offset value through the new satellite communication path.

With the satellite communication system 10, the initiation process for adjusting the propagation parameter includes the CLT adjustment (the CLPC adjustment) (e.g., the closed loop adjustment of the propagation parameter).

With the satellite communication system 10, the initiation process for adjusting the propagation parameter includes the OLPC adjustment (e.g., the open loop adjustment of the propagation parameter).

With the satellite communication system 10, the controller 20 is further configured to transmit the offset value to the communication terminals 24 through the new satellite communication path in response to the RFT switch controller 23 switching the satellite communication path from the old satellite communication path to the new satellite communication path.

With the satellite communication system 10, the controller 20 is further configured to transmit the identifier of the new satellite communication path (e.g., the active communication path identification indicative of the second satellite communication path) to the communication terminals 24 through the new satellite communication path in response to the RFT switch controller 23 switching the satellite communication path from the old satellite communication path to the new satellite communication path.

With the satellite communication system 10, the offset value of the network parameters of the old and new satellite communication paths includes the new timing offset of the network delays along the old and new satellite communication paths (e.g., the timing offset value between a first network delay along the first satellite communication path and a second network delay along the second satellite communication path).

With the satellite communication system 10, the communication terminals 24 are further configured to adjust the propagation timing (e.g., the signal propagation timing of the propagation parameter) based on the new timing offset in response to receiving the new offset value through the new satellite communication path.

With the satellite communication system 10, the offset value of the network parameters of the old and new satellite communication paths includes the delta value of the network attenuation of the old and new satellite communication path (e.g., the attenuation offset value between a first network attenuation along the first satellite communication path and a second network attenuation along the second satellite communication path).

With the satellite communication system 10, the communication terminals 24 are further configured to adjust the propagation power (e.g., the signal propagation power of the propagation parameter) based on the delta value in response to receiving the delta value through the new satellite communication path.

The satellite communication system 10 further includes the first RFT 16A (e.g., the first radio frequency transceiver) and the second RFT 16B (e.g., the second radio frequency transceiver. The first RFT 16A is located between the gateway 12 and the satellite 14 on the first satellite communication path CA. The second RFT 16B is located between the gateway 12 and the satellite 12 on the second or third satellite communication path CB or CC (e.g., the second communication path). The second RFT 16B is located away from the first RFT 16A.

The satellite communication system 10 further includes the second RFT 16B (e.g., the radio frequency transceiver) connected to the gateway 12 through the second and third communication paths PB and PC (e.g., first and second terrestrial communication paths) that are different from each other. The second and third communication paths PB and PC are included in the old and new satellite communication paths, respectively.

In the illustrated embodiment, the gateway 12 (e.g., the ground station) is configured to communicate with the communication terminals 24 through the satellite communication path between the gateway 12 and the communication terminals 24 via the satellite 14. The gateway 12 includes the RFT switch controller 23 (e.g., the diversity switch) and the controller 20 (e.g., the electronic controller). The RFT switch controller 23 is configured to switch the satellite communication path (CA, CB or CC) from the old satellite communication path (e.g., the first satellite communication path) to the new satellite communication path (e.g., the second satellite communication path) different from the old satellite communication path. The controller 20 is configured to transmit the offset value (the delta value) of network parameters of the old and new satellite communication paths to the communication terminals 24 through the new satellite communication path such that the communication terminals 24 updates the propagation parameter for communication with the gateway 12 based on the offset value in response to receiving the offset value through the new satellite communication path.

With the gateway 12, the offset value of the network parameters of the old and new satellite communication paths includes the new timing offset of the network delays along the old and new satellite communication paths (e.g., the timing offset value between a first network delay along the first satellite communication path and a second network delay along the second satellite communication path).

With the gateway 12, the offset value of the network parameters of the old and new satellite communication paths includes the delta value of the network attenuation of the old and new satellite communication path (e.g., the attenuation offset value between a first network attenuation along the first satellite communication path and a second network attenuation along the second satellite communication path).

In the illustrated embodiment, the propagation parameter update process (e.g., the satellite communication method) includes: switching the satellite communication path (CA, CB or CC) between the gateway 12 (e.g., the ground station) and the communication terminals 24 via the satellite 14 from the old satellite communication path (e.g., the first satellite communication path) to the new satellite communication path (e.g., the second satellite communication path) different from the old satellite communication path; transmitting the offset value (the delta value) of network parameters of the old and new satellite communication paths to the communication terminals 24 through the new satellite communication path; and updating the propagation parameter for the communication terminals 24 to communicate with the gateway 12 based on the offset value in response to receiving the offset value through the new satellite communication path.

With the propagation parameter update process, further includes starting the initiation process for adjusting the propagation parameter for the communication terminals 24 to establish communication with the gateway 12 through the new satellite communication path prior to receiving the offset value through the new satellite communication path, and stopping the initiation process and updating the propagation parameter based on the offset value in response to receiving the offset value through the new satellite communication path.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A satellite communication system comprising:
   a communication terminal; and
   a ground station configured to communicate with the communication terminal through a satellite communication path between the ground station and the communication terminal via a satellite, the ground station including
      a diversity switch configured to switch the satellite communication path from a first satellite communication path to a second satellite communication path different from the first satellite communication path, and
      an electronic controller configured to transmit an offset value of network parameters of the first and second satellite communication paths to the communication terminal through the second satellite communication path,
   the communication terminal being configured to update a propagation parameter for communication with the ground station based on the offset value in response to receiving the offset value through the second satellite communication path.

2. The satellite communication system according to claim 1, wherein
   the communication terminal is further configured to start an initiation process for adjusting the propagation parameter to establish communication with the ground station through the second satellite communication path prior to receiving the offset value through the second satellite communication path, and
   the communication terminal is further configured to stop the initiation process and update the propagation parameter based on the offset value in response to receiving the offset value through the second satellite communication path.

3. The satellite communication system according to claim 2, wherein
   the communication terminal is further configured to update the propagation parameter based on the propagation parameter before starting the initiation process and the offset value in response to receiving the offset value through the second satellite communication path.

4. The satellite communication system according to claim 3, wherein
   the communication terminal is further configured to store an adjustment value of the propagation parameter during the initiation process, and
   the communication terminal is further configured to calculate the propagation parameter before starting the initiation process based on the adjustment value in response to receiving the offset value through the second satellite communication path.

5. The satellite communication system according to claim 2, wherein
   the initiation process for adjusting the propagation parameter includes an closed loop adjustment of the propagation parameter.

6. The satellite communication system according to claim 2, wherein
   the initiation process for adjusting the propagation parameter includes an open loop adjustment of the propagation parameter.

7. The satellite communication system according to claim 1, wherein
   the electronic controller is further configured to transmit the offset value to the communication terminal through the second satellite communication path in response to the diversity switch switching the satellite communication path from the first satellite communication path to the second satellite communication path.

8. The satellite communication system according to claim 7, wherein
   the electronic controller is further configured to transmit an active communication path identification indicative of the second satellite communication path to the communication terminal through the second satellite communication path in response to the diversity switch switching the satellite communication path from the first satellite communication path to the second satellite communication path.

9. The satellite communication system according to claim 1, wherein
   the offset value of the network parameters of the first and second satellite communication paths includes a timing offset value between a first network delay along the first satellite communication path and a second network delay along the second satellite communication path.

10. The satellite communication system according to claim 9, wherein
    the communication terminal is further configured to adjust a signal propagation timing of the propagation parameter based on the timing offset value in response to receiving the offset value through the second satellite communication path.

11. The satellite communication system according to claim 1, wherein
the offset value of the network parameters of the first and second satellite communication paths includes an attenuation offset value between a first network attenuation along the first satellite communication path and a second network attenuation along the second satellite communication path.

12. The satellite communication system according to claim 11, wherein
the communication terminal is further configured to adjust a signal propagation power of the propagation parameter based on the attenuation offset value in response to receiving the offset value through the second satellite communication path.

13. The satellite communication system according to claim 1, further comprising
a first radio frequency transceiver located between the ground station and the satellite on the first satellite communication path, and
a second radio frequency transceiver located between the ground station and the satellite on the second satellite communication path, the second radio frequency transceiver being located away from the first radio frequency transceiver.

14. The satellite communication system according to claim 1, further comprising
a radio frequency transceiver connected to the ground station through first and second terrestrial communication paths that are different from each other, the first and second terrestrial communication paths being included in the first and second satellite communication paths, respectively.

15. A ground station configured to communicate with a communication terminal through a satellite communication path between the ground station and the communication terminal via a satellite, the ground station comprising:
a diversity switch configured to switch the satellite communication path from a first satellite communication path to a second satellite communication path different from the first satellite communication path; and
an electronic controller configured to transmit an offset value of network parameters of the first and second satellite communication paths to the communication terminal through the second satellite communication path such that the communication terminal updates a propagation parameter for communication with the ground station based on the offset value in response to receiving the offset value through the second satellite communication path.

16. The ground station according to claim 15, wherein
the offset value of the network parameters of the first and second satellite communication paths includes a timing offset value between a first network delay along the first satellite communication path and a second network delay along the second satellite communication path.

17. The ground station according to claim 15, wherein
the offset value of the network parameters of the first and second satellite communication paths includes an attenuation offset value between a first network attenuation along the first satellite communication path and a second network attenuation along the second satellite communication path.

18. A satellite communication method comprising:
switching a satellite communication path between a ground station and a communication terminal via a satellite from a first satellite communication path to a second satellite communication path different from the first satellite communication path;
transmitting an offset value of network parameters of the first and second satellite communication paths to the communication terminal through the second satellite communication path; and
updating a propagation parameter for the communication terminal to communicate with the ground station based on the offset value in response to receiving the offset value through the second satellite communication path.

19. The satellite communication method according to claim 18, further comprising
starting an initiation process for adjusting the propagation parameter for the communication terminal to establish communication with the ground station through the second satellite communication path prior to receiving the offset value through the second satellite communication path, and
stopping the initiation process and updating the propagation parameter based on the offset value in response to receiving the offset value through the second satellite communication path.

* * * * *